United States Patent

Burg et al.

[11] Patent Number: 5,544,950
[45] Date of Patent: Aug. 13, 1996

[54] DRIVE SLIP CONTROL SYSTEM

[75] Inventors: Andreas Burg, Clayton, Australia; Johannes Schmitt, Markgroeningen, Germany

[73] Assignee: Robert Bosch GmbH, Stuttgart, Germany

[21] Appl. No.: 360,839

[22] PCT Filed: Jun. 24, 1993

[86] PCT No.: PCT/DE93/00549

§ 371 Date: Dec. 30, 1994

§ 102(e) Date: Dec. 30, 1994

[87] PCT Pub. No.: WO94/01310

PCT Pub. Date: Jan. 20, 1994

[30] Foreign Application Priority Data

Jul. 6, 1992 [DE] Germany .................. 42 22 159.5

[51] Int. Cl.⁶ .................. B60T 8/32; B60K 28/16
[52] U.S. Cl. .................. 303/165; 303/DIG. 7
[58] Field of Search .................. 303/165, 154, 303/163, 164, DIG. 7, 113.2, 142, 149, 122.02, 186, 141, 169, 191, 139, 145; 180/197; 364/426.01, 426.02, 426.03; 188/181 C

[56] References Cited

U.S. PATENT DOCUMENTS

| 4,530,059 | 7/1985 | Brearley et al. | 303/154 |
| 4,545,623 | 10/1985 | Sato et al. | 303/122.02 |
| 4,566,737 | 1/1986 | Masaki et al. | 188/181 C |
| 4,763,960 | 8/1988 | Uchida et al. | 303/97 |
| 4,783,126 | 11/1988 | Arikawa et al. | 303/96 |
| 4,843,552 | 6/1989 | Inagaki | 303/141 |
| 4,844,557 | 7/1989 | Giers | 303/DIG. 7 |
| 5,015,042 | 5/1991 | Yoshino | 303/DIG. 7 |
| 5,060,747 | 10/1991 | Eto | 180/197 |
| 5,117,934 | 6/1992 | Tsuyama et al. | 180/197 |
| 5,292,184 | 3/1994 | Takata | 303/DIG. 7 |
| 5,299,131 | 3/1994 | Haas et al. | 180/197 |
| 5,415,468 | 5/1995 | Latarnik et al. | 303/186 X |
| 5,429,428 | 7/1995 | Yasuda | 303/169 |

FOREIGN PATENT DOCUMENTS

| 510466 | 10/1992 | European Pat. Off. |  |
| 4036742 | 5/1992 | Germany . |  |
| 4216514 | 11/1993 | Germany . |  |
| 3-67764 | 3/1991 | Japan | 303/DIG. 7 |
| 2165013 | 4/1986 | United Kingdom . |  |
| 2233414 | 1/1991 | United Kingdom | 303/DIG. 7 |
| 2248661 | 4/1992 | United Kingdom . |  |

Primary Examiner—Douglas C. Butler
Attorney, Agent, or Firm—Felfe & Lynch

[57] ABSTRACT

The slip of at least one driven wheel is compared to a predetermined threshold and the wheel is braked or torque is reduced when the threshold is exceeded. The slip threshold is raised when an impermissible difference between diameters of the tires on driven wheels is detected.

15 Claims, 1 Drawing Sheet

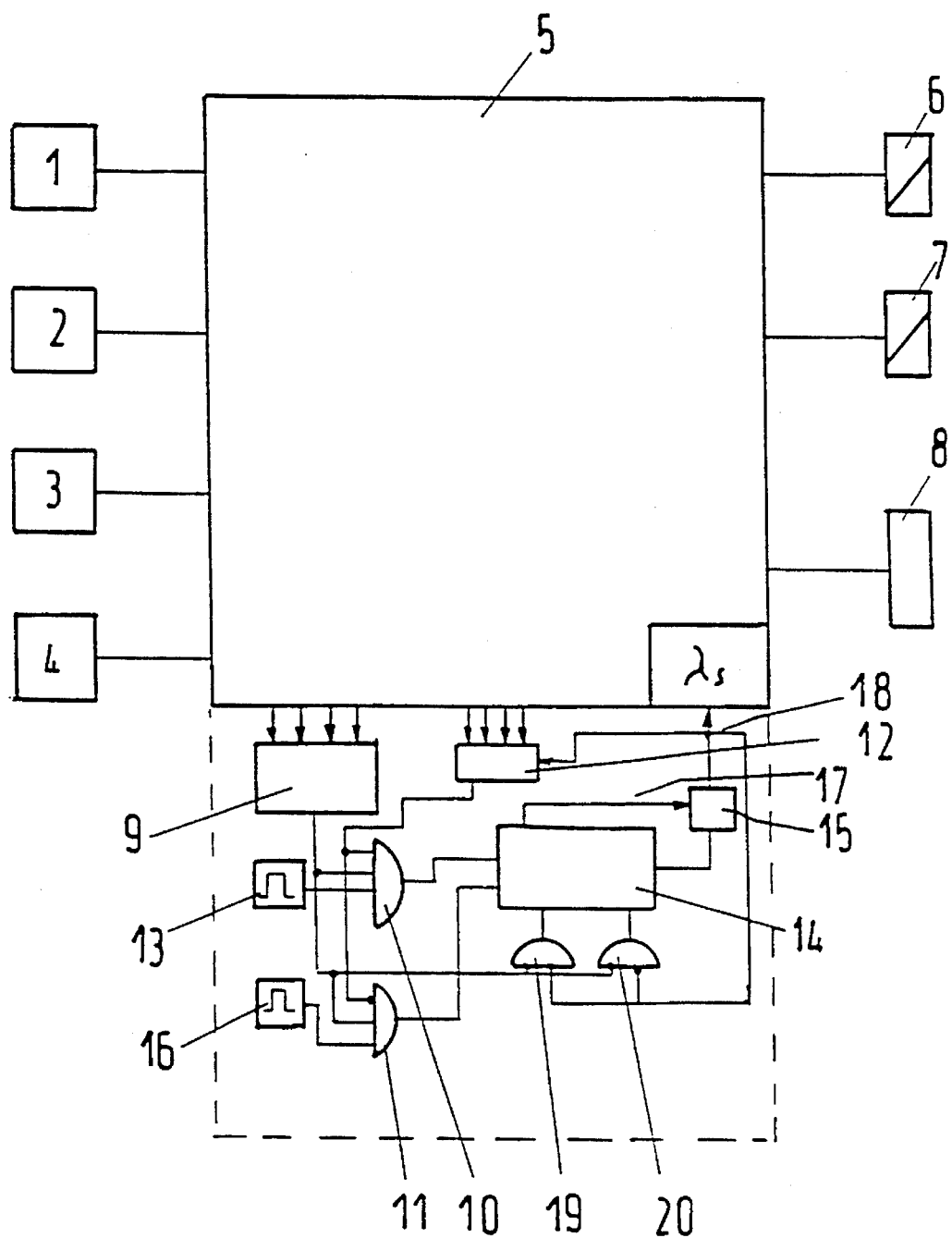

DRIVE SLIP CONTROL SYSTEM

PRIOR ART

Traction (drive slip) control systems which, when the driven wheels spin or are expected to spin, brake the wheels or reduce the driving torque of the engine in order to avoid spinning are known. It is also known that the control system in anti-lock systems and traction control systems can be triggered erroneously if the diameters of the tires differ, e.g. due to differences in pressure, thus simulating a slip between a wheel speed and the vehicle speed.

In the prior art, the diameters of the wheels are matched to one another computationally in order to avoid incorrect triggering.

SUMMARY OF THE INVENTION

The invention takes a different approach to the solution of the problem from the prior art in that it raises the slip thresholds when an impermissible difference between the diameters of tires on the driven wheels is detected. This solution is easier to implement. If the solution adopted in the traction control system is one where the slip threshold is reduced continuously from a high initial value to a low threshold, as described in DE-A 42 16 514, the invention can be implemented in such a way here that, when a difference is detected, the slip threshold is set to the high threshold value or held there.

The specification will describe the conditions under which the monitoring of the tire tolerances is performed and how it can be performed.

BRIEF DESCRIPTION OF THE DRAWING

The sole FIGURE is a schematic of the drive slip control system.

DETAILED DESCRIPTION OF THE PREFERRED EMBODIMENT

Wheel speed sensors 1 and 2 are associated with the non-driven wheels (front wheels) and sensors 3 and 4 are associated with the driven wheels. A traction control unit 5 receives the sensor signals and, when there is a risk of spinning, outputs control signals for brake-pressure control valves 6 and 7 assigned to the driven wheels and/or for an element 8 designed, for example, to influence the throttle valve.

In the control unit 5, the speed signals from the non-driven wheels are used to produce a reference signal to which the speed signals from the driven wheels are compared. If the wheel-speed signal of a driven wheel exceeds the reference signal by a predetermined slip value $\lambda_s$, then the driven wheels, for example, are braked. The slip value $\lambda_s$ (slip threshold) can be varied between an upper and a lower limiting value $\lambda_o$ and $\lambda_u$ respectively, the upper limiting value $\lambda_o$ being taken as the starting point at the beginning of control and the slip value being reduced continuously to $\lambda_u$ if and for as long as at least one wheel is unstable. Starting from the slip value $\lambda_x$ that has been reached, the slip value is then raised continuously to $\lambda_o$ as long as none of the wheels is unstable. Starting from the particular slip value $\lambda_x$ reached, the slip value is then raised or lowered again, depending on whether at least one wheel is unstable or both are stable.

According to the invention, the slip threshold $\lambda_s$ is to be set to the high slip value or held there if the system detects that the diameters of the tires differ and that there is thus a danger that control will be triggered erroneously.

The check for an impermissible difference is only carried out if it is ascertained in a block 9 that there is no brake-light signal BLS no anti-lock, traction or other form of control of the brake pressure or the engine torque is in progress the accelerator pedal is not being pressed down sharply $DKV<DKV_{min}$ and the vehicle is not cornering |VNAL−VNAR|<VMNA (mean speed of the non-driven wheels)

In addition, account can also be taken of the condition vehicle speed>e.g. 25 km/h and there are no major changes in speed ($M_{mot}$>2250 rpm/s).

If these conditions are fulfilled, block 9 outputs a signal to AND gates 10 and 11.

In a block 12, the system ascertains, by checking the following conditions, whether there is a difference which could have the effect of triggering control erroneously.

An impermissible difference is taken to be present if either 1. the mean speeds of the wheels of the two axles differ from one another by a predetermined percentage x of the mean speed of the non-driven wheels (VMAN−VMNA)>x VMNA or 2. the magnitude of the difference between speeds of the driven wheels is greater than a percentage x of the mean speed of the non-driven wheels |VHL−VHR|>x VMNA and, in addition, either (VHL−VHR)>0 and (VNAR−VHR)<x VMNA or (VHL−VHR)<0 and (VNAL−VHL)<x VMNA If one of the two conditions 1 or 2 is met, block 12 outputs a signal; if there is simultaneously a signal from block 9 at the AND gate 10, the AND gate 10 allows pulses from a pulse generator 13 through to a counter 14 which counts up from an initial value (e.g. 0). If, after a certain time, it reaches a predetermined count (e.g. 1200), it outputs a signal and sets a bistable element 15 to its second position. The output signal which is then produced by this element 15 now forces the slip threshold $\lambda_s$ up to the high slip value.

If condition 1 or 2 is no longer met, then AND gate 11 is enabled instead of AND gate 10, allowing through the pulses of a pulse generator 16. These pulses reverse the count of the counter 14. If it reaches the starting position, the bistable element 15 is reset (line 17).

The value for x can differ depending on whether the bistable element 15 outputs a signal (x=0.015) or not (x=0.020 (line 18).

When the output signal of block 9 disappears and block 15 is not outputting an output signal either, the counter 14 is reset to the starting position. If the output signal of block 9 disappears while there is an output signal from the bistable element 15, the counter is set to the predetermined count (e.g. 1200). This is effected by AND gates 19 and 20.

We claim:

1. Drive slip control system for a vehicle having driven wheels, non-driven wheels, and an engine which produces torque, said wheels bearing tires having a diameter, said system comprising means for determining the speeds VHL and VHR of the driven wheels, means for determining the speeds VNAL and VNAR of the nondriven wheels, means for determining the slip of the driven wheels, means for comparing the slip of at least one driven wheel to a predetermined slip threshold, means for at least one of braking said at least one driven wheel and reducing said torque when said slip exceeds said predetermined threshold, means for detecting an impermissible difference between the diameters of the tires on the driven wheels based solely on the speeds of the driven wheels and the speeds of the non-driven wheels, and means for raising said predetermined slip threshold when said impermissible difference is detected.

2. Drive slip control system as in claim 1 wherein said means for raising said slip threshold raises said threshold to an initial value when said impermissible difference is detected and thereafter lowers said threshold.

3. Drive slip control system as in claim 1 wherein said means said means for detecting an impermissible difference is active only in periods without braking, at low engine torque, in the absence of cornering, and in the absence of at least one of brake pressure control and engine torque control.

4. Drive slip control system as in claim 1 further comprising means for determining the mean speed of the driven wheels, means for determining the mean speed of the non-driven wheels, means for determining the difference between the mean speed of the driven wheels and the mean speed of the non-driven wheels, and means for comparing said difference to a predetermined value, an impermissible difference being detected when said difference exceeds said predetermined value for a predetermined time.

5. Drive slip control system as in claim 4 further comprising a counter which is incremented when said impermissible difference is exceeded, said counter being decremented when said predetermined difference is not exceeded, said predetermined slip threshold being raised when said counter reaches a predetermined count.

6. Drive slip control system as in claim 5 wherein said predetermined slip threshold is raised until the counter is decremented to the count present when said impermissible difference was exceeded.

7. Drive slip control system as in claim 1 further comprising means for determining the magnitude $|VHL-VHR|$ of the difference between the speeds of the driven wheels, and means for determining the mean wheel speed VMNA of the non-driven wheels, an impermissible difference being detected when $|VHL-VHR|$ is greater than a percentage of VMNA and either $(VHL-VHR) > 0$ and $(VNAL-VHR) < x \; VMNA$ or $(VHL-VHR) > 0$ and $(VNAL-VHL) < x \; VMNA$.

8. Drive slip control system as in claim 7 further comprising a counter which is incremented when said impermissible difference is exceeded, said counter being decremented when said predetermined difference is not exceeded, said predetermined slip threshold being raised when said counter reaches a predetermined count.

9. Drive slip control system as in claim 8 wherein said predetermined slip threshold is raised until the counter is decremented to the count present when said impermissible difference was exceeded.

10. Drive slip control system for a vehicle having driven wheels, non-driven wheels, and an engine which produces torque, said wheels bearing tires having a diameter, said system comprising means for determining the slip of the driven wheels, means for comparing the slip of at least one driven wheel to a predetermined slip threshold, means for at least one of braking said at least one driven wheel and reducing said torque when said slip exceeds said predetermined threshold, means for determining the mean speed of the driven wheels, means for determining the mean speed of the non-driven wheels, means for determining the difference between the mean speed of the driven wheels and the mean speed of the non-driven wheels, means for detecting an impermissible difference between the diameters of the tires on the driven wheels by comparing said difference between mean speeds to a predetermined value, an impermissible difference being detected when said difference between mean speeds exceeds said predetermined value for a predetermined time, and means for raising said predetermined slip threshold when said impermissible difference is detected.

11. Drive slip control system as in claim 10 further comprising a counter which is incremented when said impermissible difference is exceeded, said counter being decremented when said predetermined difference is not exceeded, said predetermined slip threshold being raised when said counter reaches a predetermined count.

12. Drive slip control system as in claim 11 wherein said predetermined slip threshold is raised until the counter is decremented to the count present when said impermissible difference was exceeded.

13. Drive slip control system for a vehicle having driven wheels, non-driven wheels, and an engine which produces torque, said wheels bearing tires having a diameter, said system comprising means for determining the slip of the driven wheels, means for comparing the slip of at least one driven wheel to a predetermined slip threshold, means for at least one of braking said at least one driven wheel and reducing said torque when said slip exceeds said predetermined threshold, means for determined the speeds VHL and VHR of the driven wheels, means for determining the magnitude $|VHL-VHR|$ of the difference between the speeds of the driven wheels, means for determining speeds VNAL and VNAR of the non-driven wheels, and means for determining the mean wheel speed VMNA of the non-driven wheels, means for detecting an impermissible difference between the diameters of the tires on the driven wheels when $|VHL-VHR|$ is greater than a percentage x of VMNA and either $(VHL-VHR) > 0$ and $(VNAR-VHR) < x \; VMNA$ or $(V_{HL} - V_{HR}) > 0$ and $(V_{NAL} - V_{HL}) < x \ V_{MNA}$, and means for raising said predetermined slip threshold when said impermissible difference is detected.

14. Drive slip control system as in claim 13 further comprising a counter which is incremented when said impermissible difference is exceeded, said counter being decremented when said predetermined difference is not exceeded, said predetermined slip threshold being raised when said counter reaches a predetermined count.

15. Drive slip control system as in claim 14 wherein said predetermined slip threshold is raised until the counter is decremented to the count present when said impermissible difference was exceeded.

* * * * *